Jan. 3, 1933. W. H. REES 1,893,243
WEIGHING APPARATUS
Filed Sept. 26, 1927   2 Sheets-Sheet 1
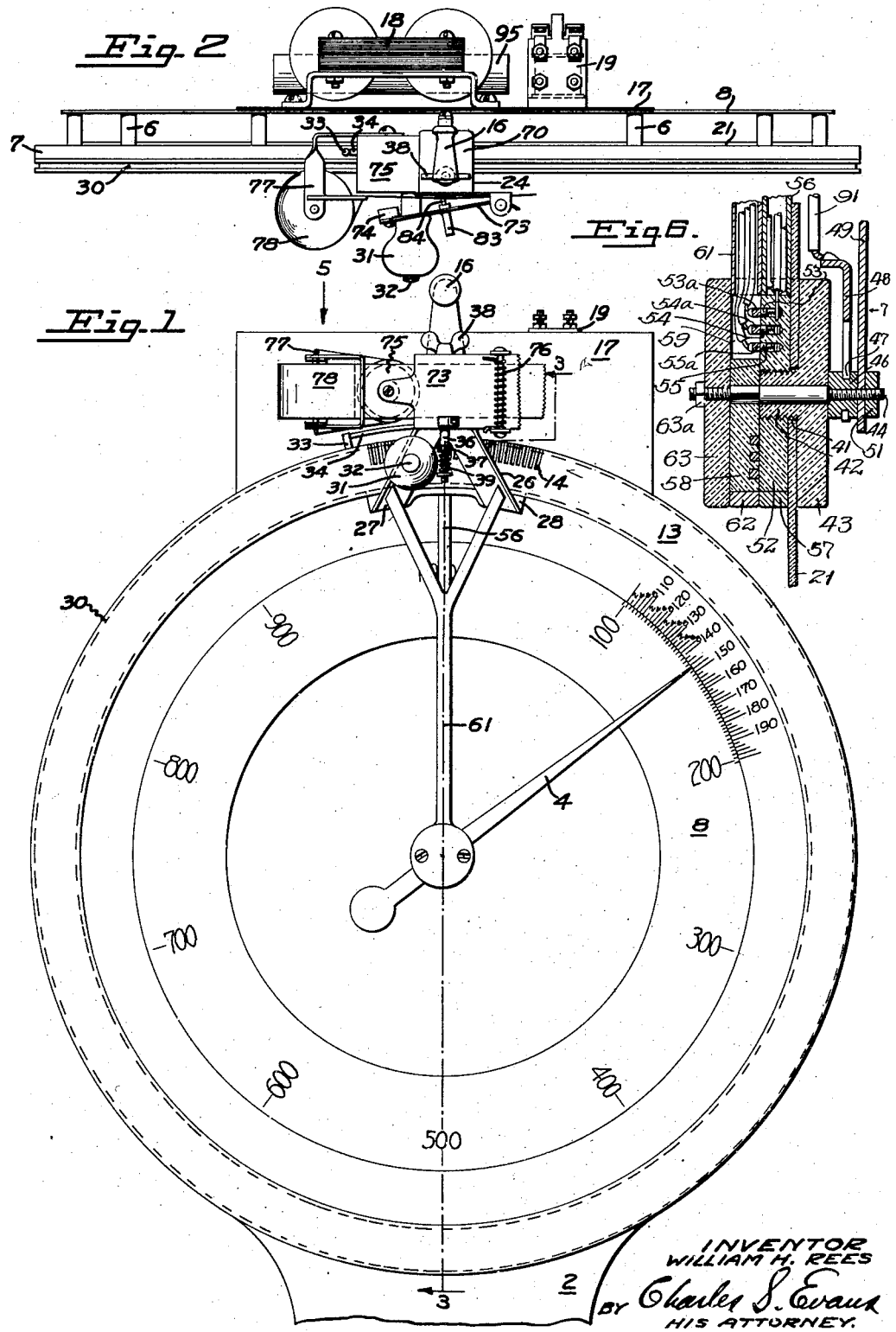

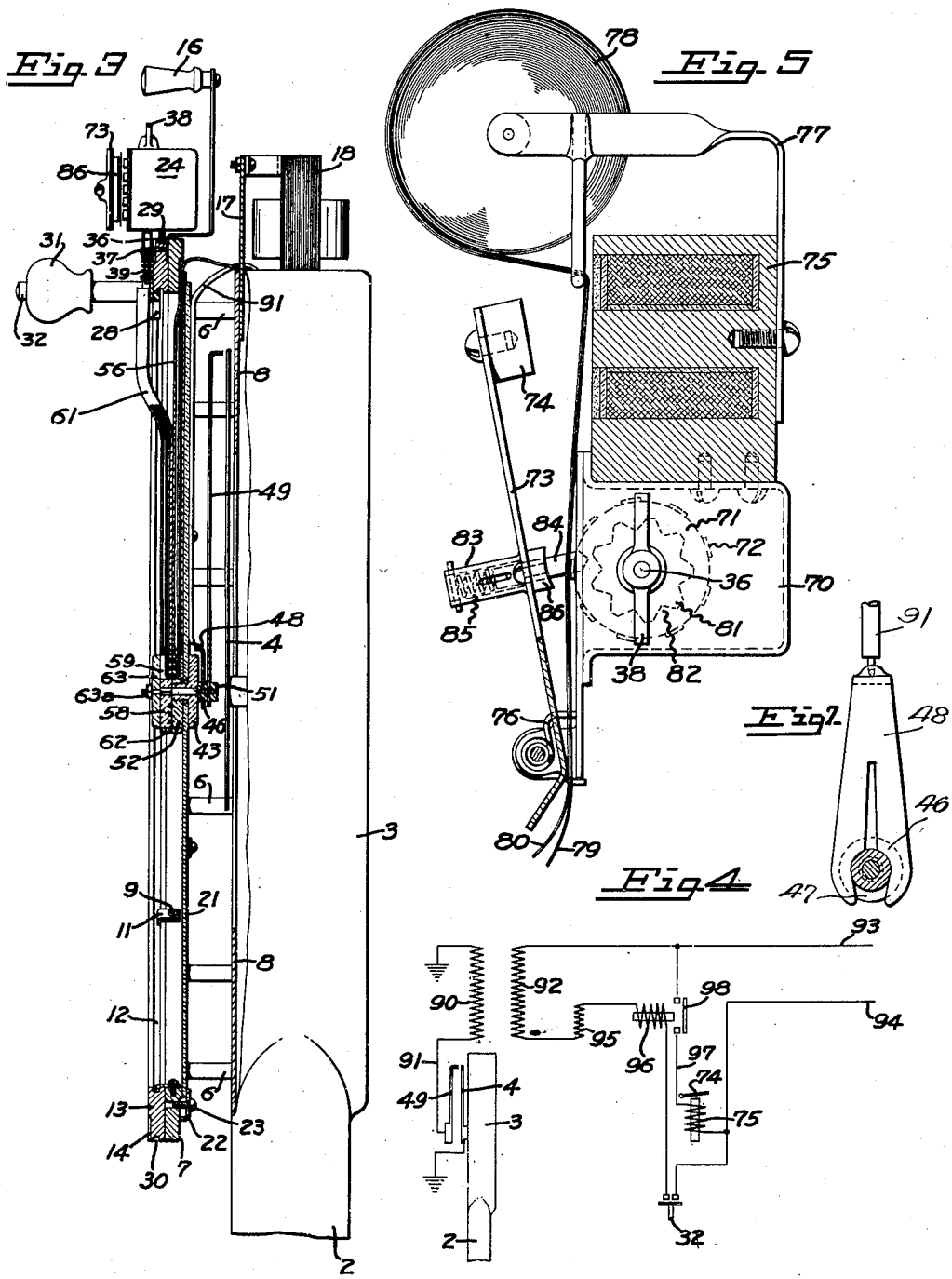

Patented Jan. 3, 1933

1,893,243

UNITED STATES PATENT OFFICE

WILLIAM H. REES, OF BERKELEY, CALIFORNIA

WEIGHING APPARATUS

Application filed September 26, 1927. Serial No. 222,042.

My invention relates to a recording mechanism for weighing apparatus, and one of the objects of the invention is to provide a mechanism movably mounted on a scale, so that it can be shifted to a position which registers with that of the scale pointer and then operated to record the weight.

Another object of the invention is to provide electrical means for operating the recording mechanism.

Another object of the invention is to provide a recording mechanism with a pinion which is in mesh with a notched rim upon which the mechanism is mounted.

Another object of the invention is to provide means for automatically producing a printed ticket showing the weight of an object as indicated on the dial of a scale, and also a ticket showing the indicated weights of two or more objects singly or collectively.

Another object is to provide means for manually operating said ticket printing mechanism, if so desired.

Another object of the invention is to provide means for alining the type of the recording mechanism.

Other objects of the invention, together with the foregoing, will be set forth in the following description of my preferred embodiment of means for practicing the invention and which is illustrated in the drawings accompanying and forming part of the specification. It is to be understood that I do not limit myself to the showing made by the said description and drawings, as I may adopt variations of my preferred form within the scope of my invention as set forth in the claims.

Referring to the drawings:

Fig. 1 is a front elevation showing a weighing apparatus and the mounting of the recording mechanism thereon.

Fig. 2 is a plan view of the view shown in Fig. 1.

Fig. 3 is a side elevation, partly in section, taken in a plane indicated by the line 3—3 of Fig. 1. In this view the scale pointer is shown at zero position.

Fig. 4 is a diagrammatic view of the control circuits for operating the recording mechanism of my invention.

Fig. 5 is an enlarged side elevational view of the recording mechanism of my invention. The electro-magnet and a portion of the armature supporting arm are shown in section.

Fig. 6 is an enlarged section of the wiring conduit mounting shown in section in Fig. 3.

Fig. 7 is a front elevation of the high tension contact clip.

In terms of broad inclusion, my invention comprises an apparatus having an element movable in accordance with variable factors related to the operation of the apparatus; such as a weighing machine having a pointer movable over the face of the dial. Adjacent the dial and end of the pointer is mounted a movable, notched rim, and upon it is movably supported a recording mechanism of the usual type and having a pinion in mesh with the notches of the rim. The notches are of such size that each notch corresponds to one unit of weight to be measured, which in most cases is a pound. Therefore when the recorder is moved, the pinion in mesh with the notches will turn, and the recorder will register the weight which the pointer would indicate, if it were in the same position as the pinion. An arm is mounted for movement with the recording mechanism; so that when the mechanism is moved to a position in which the arm and it both register with the pointer, a circuit may be closed to cause a spark to jump across a variable gap between the tip of the arm and that of the pointer, the tips thus serving as electrodes. The closing of the circuit operates an electromagnet, of the recording mechanism, which attracts an armature mounted on a movable arm. The arm has an anvil adapted to strike against impression receiving material, such as paper placed between it and the type wheel of the recording mechanism, to cause an impression of the recorded weight on said paper. Means are provided for mounting the wiring equipment on the apparatus.

It often happens that the type of the type wheel is not parallel with the surface of the paper when the impression is made, hence an imperfect stamping is obtained. To overcome this defect, a plunger is slidably mounted on the armature supporting arm of the recording mechanism. When the arm is pulled toward the type wheel, the plunger is adapted to fit within the notches of a notched wheel fixed to a type wheel, so as to aline the type.

In terms of greater detail, my invention comprises a weighing apparatus having the usual standard 2, and a circular housing 3 in which a portion of the mechanism for moving the pivotally mounted pointer 4 is contained. Supported on the housing 3 by means of posts 6 is a stationary rim 7 while adjacent the housing and also supported on the posts 6 is a dial 8. Fixed to the rim 7 by means of screws 9, or welded thereto, is a series of clamps 11 having their ends bent to fit in the groove 12 of the rim 13 so as to movably support the rim adjacent to and on rim 7. On the outer surface of rim 13 is a series of notches 14, each notch corresponding to a unit of weight measure, that is, as many notches as there are pound graduations on the scale. A handle 16 is fixed to the movable rim in order to provide means for moving it. Mounted on top of the housing 3 and fixed to a plate 17, which is supported by the housing, are a transformer 18 and a relay or translating device 19 forming part of an electrical circuit for operating the recording mechanism. A sheet of plate glass 21 is clamped to the inner side of rim 7 by means of clamps 22 fixed to said rim by bolts 23.

Means are provided for movably mounting a recording mechanism on the movable rim. A recording mechanism 24 of the usual type, having a series of type or recording wheels is provided with an electro-magnet for attracting an armature against the type to cause an impression to be made upon the recording means, and is fixed to a supporting bracket having the arms 26 and 27. Fixed to the arms 26 and 27 is a guide rail 28 adapted to slide in the groove 12, while fixed to the recording mechanism is a similar guide rail 29 adapted to slide within a groove 30, on the outer periphery of the rim. A handle 31 is fixed to the arm 27 and by means of it the recording mechanism can be moved. By means of the push button 32, a switch within the handle may be closed to control the electrical circuit for operating the recording mechanism. Upon the stationary rim 7 is fixed a lug 33 engaging an arm 34 fixed to the recording mechanism, so as to limit counter-clockwise movement of the recorder and to provide means for holding it in stationary position when the movable rim 13 is moved.

Means are provided for turning the type wheels when the recording mechanism is moved. Fixed to the shaft 36 upon which the type wheels are journaled in a pinion 37 in mesh with the notches of the movable rim, while a key 38 is provided for pulling the pinion out of mesh with the notches so as to set the type wheels if so desired. A spring 39 is interposed between the pinion and the end of shaft 36.

On the apparatus are provided means for housing the wires of the electrical circuit and for maintaining them in connection while the recording mechanism is moved. Within an aperture 41 on the plate glass 21, more clearly shown in Fig. 6, is an insulating bushing 42 preferably integral with an insulating disk 43 adjacent the inner side of plate glass 21. Journaled in the bushing and disk is a shaft 44 of electrical conducting material, and which is axially alined with the shaft upon which the scale pointer 4 is pivotally mounted. The inner portion of the shaft 44 is threaded, and screwed thereon is a contact disk 46 of electrical conducting material. Within the groove 47 in the outer periphery of disk, the snap terminal lug 48 is held. At the end of the terminal is a lead connected to the secondary coil of transformer 18. Threaded on the shaft is an arm 49 of electrically conducting material, and which is held in place by the lock nut 51. The end of the arm is bent to form an electrode. It is thus seen that when the shaft 44 is caused to rotate, the arm 49 will rotate therewith, and hence a variable gap exists between the electrode and the end of the scale pointer 4 which also serves as an electrode. When the arm and pointer register with each other or are in alinement, the distance of the gap will be at a minimum.

On the bushing 42 is threaded a stationary insulating disk 52 which has three contact brushes 53, 54, and 55 in the surface thereof. Connected to said brushes are three leads housed in the conduit 56 which is fixed to the ring 57 about disk 52 and which leads to a point adjacent to and on the inner side of the fixed rim. The leads form part of the wiring of the primary circuit for operating the recording mechanism.

Adjacent the disk 52 is an insulating disk 58 keyed to shaft 44, and which has a hollow portion 59. Slip rings 53a, 54a, and 55a are fixed in the surface of said disk and are adapted to contact with the brushes of disk 52. Connected to said slip rings are three wires housed in a conduit 61, leading to the hollow portion, and fixed to a ring 62 about disk 58. It is also fixed to the arms 26 and 27 of the counter mechanism supporting bracket. The leads housed in conduit 61 also form part of the primary circuit.

Threaded on shaft 44 and adjacent disk 58, is an insulating disk 63 held in position by lock nut 63a. It is thus seen that when the recording mechanism is moved, conduit 61 will move therewith and since it is fixed to disk 58, the disk will rotate. Since the disk is keyed to shaft 44, the shaft will turn and so will arm 49, for it is fixed to the shaft. At the same time contact is maintained between the brushes and slip rings, and hence the leads in conduits 56 and 61 are always connected.

Referring to Fig. 5, the recording mechanism 24 comprises a housing 70 which serves as a support for a series of type wheels 71 journaled therein by means of shaft 36, and having numeral type 72 on the surface thereof. The usual mechanism is employed, that is, the wheels are so geared that the second wheel will not turn until the first has made a complete revolution, while the third will not turn until the second has made a complete revolution. Pivotally or movably mounted on the housing or support is an arm 73 having an armature 74 adapted to be attracted by the printing solenoid 75 which is fixed to the housing. Movement toward the solenoid is yieldingly resisted by the spring 76. Upon the solenoid is mounted a bracket 77 supporting a roll 78 of impression receiving material such as two sheets of paper 79 and 80, both of which are adapted to unroll across the type wheels. One of said sheets is a strip of carbon paper.

Means are provided for alining the type wheels. Upon the first type wheel is fixed a wheel 81 having V shaped notches 82 in the periphery thereof. Slidably or movably mounted in a housing 83 on the arm 73 is a plunger 84 having a beveled end, complementary to the V shaped notches, and interposed between the plunger and the end of the housing is a spring 85 for yieldingly resisting rearward movement of the plunger. An anvil 86 for providing a contact surface against which the type may strike is placed adjacent the plunger and in alinement therewith.

When the armature is attracted by the solenoid 75 and the type wheels happen to be in a position to cause an imperfect impression on the paper, the plunger will first engage the nearest notch to aline the type; so that the surface thereof will be approximately parallel with the surface of the impression receiving means, before the anvil strikes the paper. Inasmuch as all the type wheels are geared together, the alinement of one wheel will aline all the wheels.

In Fig. 4 is illustrated the wiring diagram for operating the recording mechanism. One side of the secondary coil 90 of transformer 18, mounted on the weighing apparatus, is grounded. The other side is connected by a lead 91 to the arm 49 which is adapted to move with the recording mechanism. A variable gap is maintained between the electrode of arm 49 and the end of the pointer 4, and the pointer is also grounded. This portion of the circuit comprises the high tension side. Associated with the secondary coil is a primary coil 92 which is connected by leads 93 and 94 to a source of alternating current supply. The proportions between the primary and secondary coils are such that with a voltage of 110 in the primary circuit, a potential of 2000 volts will be induced in the secondary coil.

In the lead 94 is placed an impedance 95, which is mounted on the weighing apparatus adjacent the transformer, and the solenoid 96 of translating device 19, also mounted thereon. The switch 32 of handle 31, is also included in this lead. Shunted across the wires 93 and 94 is the lead 97 including the armature switch 98 of relay 19, and the printing solenoid 75, which is adapted to attract armature 74. The leads connecting the relay, the printing solenoid and the switch 32 are housed within the conduits 56 and 61, as previously described.

*Operation.*—If an object to be weighed is placed upon the weighing apparatus, the scale pointer 4 will move in a clockwise direction proportionally to the weight of the object. Upon moving the recording mechanism by means of handle 31, to register arm 49 with the pointer, the pinion 37 will turn the type wheels of the recording mechanism since it is in mesh with the notches on the movable rim. Since these notches correspond to a unit of weight such as a pound, the recording mechanism will register the number of pounds weighed, when the arm is in alinement with the scale pointer. However, before this position is reached, switch 32 is closed by the operator, but insufficient current will flow thru the relay to energize the solenoid 96, due to the impedance of the transformer coils and also due to the resistance or impedance 95. When the arm and pointer register so that the electrodes are at approximately the minimum gap, a spark is discharged across the two electrodes, causing a momentary surge of current thru the primary coil 92 sufficient to energize the solenoid 96. As the solenoid is energized, the armature switch 98 is attracted, thus closing the circuit thru printing solenoid 75. Upon energization of the printing solenoid, the armature 74 is attracted, causing an impression of the registered weight on the paper. After this, the switch is opened and the process is repeated for the next weighing operation.

If an object is weighed which weighs more than the readable limits on the scale, the recording mechanism can be held against the stop 33, and the rim 13 moved in a counterclockwise direction until it has rotated one complete revolution. During its rotation the notches will turn the pinion in the same direction as it would turn if the recording mechanism were moved in clockwise direction, therefore the type wheels will record the highest weight of the graduated scale. The recording mechanism is then moved in a clockwise direction, as previously described, and when the arm and pointer register and the circuit is closed, the mechanism will record the true weight of the object.

From the foregoing description, it is apparent that the electrical means for automatically operating the recording mechanism can be omitted, and the device operated manually, if so desired. If the latter is desired, the recording mechanism is moved until its arm, or any other similar indicating means, registers with the pointer, and then the arm 73 of the recording mechanism is manually depressed to cause an impression of the recorded weight on the impression receiving means.

I claim:

1. In an apparatus having an element movable in accordance with variable factors related to the operation of the apparatus, a movable recording mechanism, an arm mounted for movement therewith, and electrical means for operating said recording mechanism when said arm registers with the element.

2. In an apparatus having an element movable in accordance with variable factors related to the operation of the apparatus, an electrode on said movable element, a movable recording mechanism, an arm mounted for movement therewith and having a second electrode separated from the first electrode by a variable gap, and electrical means for operating said recording mechanism when the electrodes are in a position of approximately minimum gap.

3. In an apparatus having an element movable in accordance with variable factors related to the operation of the apparatus, an electrode on said movable element, a movable recording mechanism, an arm mounted for movement therewith and having a second electrode separated from the first electrode by a variable gap, a circuit including said electrodes, a second circuit inductively coupled to said first circuit and including a translating device, and electrical means controlled by the translating device for initiating the operation of the recording mechanism when the electrodes are in a position of approximately minimum gap.

4. In an apparatus having an element movable in accordance with variable factors related to the operation of the apparatus, an electrode on said movable element, a movable recording mechanism, an arm mounted for movement therewith and having a second electrode separated from the first electrode by a variable gap, a circuit including said electrodes, a second circuit inductively coupled to said first circuit and including a translating device, electrical means controlled by the translating device for initiating the operation of the recording mechanism when the electrodes are in a position of approximately minimum gap, and means for opening and closing said second circuit.

5. In an apparatus having an element movable in accordance with variable factors related to the operation of the apparatus, an electrode on said movable element, a movable recording mechanism, an arm mounted for movement therewith and having a second electrode separated from the first electrode by a variable gap, a circuit including said electrodes, a second circuit inductively coupled to said first circuit and including a translating device, an impedance in said second circuit, and electrical means controlled by the translating device for initiating the operation of the recording mechanism when the electrodes are in a position of approximately minimum gap.

6. In an apparatus having an element movable in accordance with variable factors related to the operation of the apparatus, an electrode on said movable element, a movable recording mechanism, an arm mounted for movement therewith and having a second electrode separated from the first electrode by a variable gap, a circuit including said electrodes, a second circuit inductively coupled to said first circuit and including a translating device, an impedance in said second circuit, electrical means controlled by the translating device for initiating the operation of the recording mechanism when the electrodes are in a position of approximately minimum gap, and means for opening and closing said second circuit.

7. In an apparatus having an element movable in accordance with variable factors related to the operation of the apparatus, an electrode on said movable element, a movable recording mechanism, an arm mounted for movement therewith and having a second electrode separated from the first electrode by a variable gap, a circuit including said electrodes, a second circuit inductively coupled to said first circuit and including a translating device, and a third circuit controlled by the translating device shunted across said second circuit and including the recording mechanism.

8. In an apparatus having an element movable in accordance with variable factors related to the operation of the apparatus, an electrode on said movable element, a movable recording mechanism, an arm mounted for movement therewith and having a second electrode separated from the first electrode by a variable gap, a circuit including said electrodes, a second circuit inductively coupled to said first circuit and including a translating device, an impedance in said second circuit, and a third circuit controlled by the translating device shunted across said second circuit and including the recording mechanism.

9. In a weighing machine having a dial and a pointer movable across the face of said dial, a weight recording mechanism mounted for movement about the dial, an arm mounted for movement therewith, and means for obtaining a record of the indicated weight when said arm registers with the pointer.

10. In a weighing machine having a movable pointer, a rim adjacent thereto, a weight recording mechanism movably mounted on said rim, an arm mounted for movement therewith, and means for obtaining a record of the indicated weight when said arm registers with the pointer.

11. In a weighing machine having a movable pointer, a movable rim adjacent thereto, a weight recording mechanism movably mounted on said rim, an arm mounted for movement therewith, and means for obtaining a record of the indicated weight when said arm registers with the pointer.

12. In a weighing machine having a movable pointer, a rim adjacent thereto and having a series of notches, and a weight recording mechanism movably mounted on said rim and having a pinion in mesh with the notches.

13. In a weighing machine having a movable pointer, a movable rim adjacent thereto and having a series of notches, and a weight recording mechanism movably mounted on said rim and having a pinion in mesh with the notches.

14. In a weighing machine having a pivotally mounted pointer, a movable weight recording mechanism, a conduit fixed for movement with said mechanism, means for mounting said conduit for rotation about the axis of the pointer mounting as a center, an arm mounted for rotation with the conduit, and means for obtaining a record of the indicated weight when said arm registers with the pointer.

15. In a weighing machine having a pivotally mounted pointer, a movable weight recording mechanism, means for supporting a shaft journaled for rotation with the axis of the pointer mounting as a center, a disk keyed to said shaft, a conduit fixed at one end for movement with the mechanism and at the other end to the disk, an arm fixed to said shaft, and means for obtaining a record of the indicated weight when said arm registers with the pointer.

16. In a weighing machine having a pivotally mounted pointer, a movable weight recording mechanism, means for supporting a shaft journaled for rotation with the axis of the pointer mounting as a center, a disk keyed to said shaft, a conduit fixed at one end for movement with the mechanism and at the other end to the disk, a second disk fixed about said shaft, a conduit fixed to said second disk, an arm fixed to said shaft, and means for obtaining a record of the indicated weight when said arm registers with the pointer.

17. A recording mechanism comprising a support, a type wheel journaled on said support, means for receiving an impression of said type, a notched wheel fixed for rotation with said type wheel, an arm movably mounted on said support, and a plunger movably mounted on said arm and adapted to fit within a notch of said wheel to aline the type surface substantially parallel with said impression receiving means.

18. A recording mechanism comprising a support, a type wheel journaled on said support, means for receiving an impression of said type, a notched wheel fixed for rotation with said type wheel, an arm pivotally mounted on said support, and a plunger movably mounted on said arm and adapted to fit within a notch of said wheel to aline the type surface substantially parallel with said impression receiving means.

19. A recording mechanism comprising a support, a type wheel journaled on said support, means for receiving an impression of said type, a notched wheel fixed for rotation with said type wheel, an arm movably mounted on said support, a plunger movably mounted on said arm and adapted to fit within a notch of said wheel to aline the type surface substantially parallel with said impression receiving means, and an anvil fixed to said arm in alinement with said plunger.

20. In an apparatus having an element movable in accordance with variable factors related to the operation of the apparatus, an electrode on said movable element, recording means including a movably mounted electrode, means for mounting said second electrode adjacent the path of movement of the first electrode, an electric circuit including said electrodes, and electrically operated means for obtaining a record of the conditions to be recorded when the electrodes register.

21. In an apparatus having an element movable in accordance with variable factors related to the operation of the apparatus, an electrode on said movable element, recording means including a movably mounted electrode separated from the first electrode by a variable gap, and electrically operated means for obtaining a record of the conditions to be recorded when the electrodes are in a position of approximately minimum gap.

22. In an apparatus having an element movable in accordance with variable factors related to the operation of the apparatus, an electrode on said movable element, recording means including a movably mounted electrode separated from the first electrode by a variable gap, a circuit including said electrodes, a second circuit inductively coupled to said first circuit and including a translating device, and electrically operated means controlled by the translating device for obtaining a record of the conditions to be recorded when the electrodes are in a position of approximately minimum gap.

In testimony whereof, I have hereunto set my hand.

WILLIAM H. REES.